(12) United States Patent
Hwang

(10) Patent No.: US 11,598,503 B1
(45) Date of Patent: Mar. 7, 2023

(54) MULTI-DIRECTIONAL ADJUSTABLE SOLAR OUTDOOR PROJECTION LIGHT

(71) Applicant: METROMAX AMERICA CORPORATION, Rowland Heights, CA (US)

(72) Inventor: Christina Hwang, Rowland Heights, CA (US)

(73) Assignee: METROMAX AMERICA CORPORATION, Rowland Heights, CA (US)

( * ) Notice: Subject to any disclaimer, the term of this patent is extended or adjusted under 35 U.S.C. 154(b) by 0 days.

(21) Appl. No.: 17/699,335

(22) Filed: Mar. 21, 2022

(51) Int. Cl.
| | |
|---|---|
| *F21S 9/03* | (2006.01) |
| *F21V 21/30* | (2006.01) |
| *F21V 23/04* | (2006.01) |
| *F21V 21/08* | (2006.01) |
| *F21V 14/06* | (2006.01) |
| *F21V 17/02* | (2006.01) |
| *F21Y 115/10* | (2016.01) |

(52) U.S. Cl.
CPC ............ *F21S 9/035* (2013.01); *F21V 14/06* (2013.01); *F21V 17/02* (2013.01); *F21V 21/0824* (2013.01); *F21V 21/30* (2013.01); *F21V 23/0442* (2013.01); *F21Y 2115/10* (2016.08)

(58) Field of Classification Search
CPC . F21S 9/035; F21S 9/032; F21S 9/037; F21V 23/0442; F21V 21/0824; F21V 21/30
See application file for complete search history.

(56) References Cited

U.S. PATENT DOCUMENTS

| | | | | |
|---|---|---|---|---|
| 5,217,296 | A * | 6/1993 | Tanner | H05B 47/13 362/802 |
| 5,595,441 | A * | 1/1997 | McGee | F21L 4/04 362/240 |
| 9,197,033 | B1 * | 11/2015 | Tsai | H01S 5/02365 |
| 10,488,002 | B1 | 11/2019 | Hwang | |
| 2005/0103378 | A1 * | 5/2005 | Pu | F21V 21/0824 136/291 |
| 2007/0002561 | A1 * | 1/2007 | Tesmer | F24S 30/48 362/276 |
| 2007/0084500 | A1 * | 4/2007 | Chen | F21V 21/0824 136/244 |
| 2021/0207789 | A1 * | 7/2021 | Hsu | F21V 21/30 |
| 2021/0356098 | A1 * | 11/2021 | Liu | F21V 23/009 |

* cited by examiner

*Primary Examiner* — William N Harris

(57) ABSTRACT

A multi-directional adjustable solar outdoor projection light capable of adjusting its lighting range, angle and sensing direction includes a support assembly, and a key light, and a solar power module which are pivoted to the top of the support assembly. Both sides of the key light are pivoted with a fill light capable of adjusting the angles of elevation and depression and the front and rear directions of a projected light relative to the key light, and the support assembly is pivoted is an axially rotatable sensor, thus improving the convenience of use and expanding the lighting range of the solar outdoor projection light.

7 Claims, 8 Drawing Sheets

MULTI-DIRECTIONAL ADJUSTABLE SOLAR OUTDOOR PROJECTION LIGHT

FIELD OF THE INVENTION

The present invention relates to a solar outdoor projection light, and more particularly to a projection light capable of adjusting its lighting range, angle and sensing direction.

BACKGROUND OF THE INVENTION

Outdoor LED sensor lights are commonly used in parking lots, home entrances, private roadways, or garden paths and other environments. The sensor lights mainly use a sensor, such as a light sensor or motion detection infrared sensors to detect surrounding environmental conditions in order to achieve the effects of controlling the ON and OFF of the LED, preventing people from forgetting to turn on and off the sensor light switch, and providing a more power-saving and convenient operation and a warning function.

In general, an infrared sensor has a sensing angle and a sensing distance of a certain range, and the sensing angle is about 100~180 degrees. When the sensor senses a person at night or an approaching vehicle, the sensor light will activate the LED lighting; and when no person or vehicle is detected, the sensor light will turn off the lighting. In order to ensure that the sensor light can be illuminated normally in an area selected by users, builders need to adjust the installation position repeatedly when installing the sensor light, and thus the construction is time-consuming. In addition, the sensor light is fixed and its sensing angle cannot be adjusted flexibly, and when the users change the selected area afterwards, it is necessary to remove and reinstall the sensor light.

Furthermore, LED has the features of high light source directivity and relatively limited lighting range, and thus different models of LEDs with adjustable lighting direction available on the market are provided for the users to adjust the lighting direction of each LED lamp head on the sensor lamp and expand the lighting range of the LED lamp.

The inventor of the present invention has designed and developed a solar garden light as disclosed in U.S. Pat. No. 10,488,002, which can project a light towards the front or the rear, and adjust the focal length of the projected light with various lighting effects. However, the functions of effectively sensing and controlling the lighting and flexibly adjusting the lighting range are still limited. For example, when a user needs to project a light towards the front, rear and surrounding region of the lamp at the same time, or at different elevation/depression angles, the lighting range that the sensor light can expand is still limited and unable to meet the user requirements. Overall speaking, the sensor lamp is limited by the sensing angle and the lighting direction, so that the design of outdoor lighting is also limited. overcome the aforementioned shortcomings and effectively expanded the function and scope of applicability of the product.

In view of the aforementioned drawbacks, the inventor of the present invention provides a multi-directional adjustable outdoor solar projection light to overcome the drawbacks of the conventional projection light and expand the function and scope of applicability of the product

SUMMARY OF THE INVENTION

Therefore, it is a primary objective of the present invention to provide a solar outdoor projection light capable of adjusting its lighting range and angle, and sensing direction and allowing users to have larger lighting range and wider sensing angle and direction, (such as projecting a light with an angle towards the front and rear directions or towards the up and down directions at the same time), and the installed outdoor projection light can adjust its sensing direction as needed and improve the convenience of installation and use.

To achieve the aforementioned and other objectives, the present invention provides a multi-directional adjustable solar outdoor projection light including: a support assembly capable of adjusting a support angle, a key light installed to the top of the support assembly and capable of projecting a light towards the front, and a solar power module disposed at the top of the key light, wherein both sides of the key light are pivoted with a fill light, and the two fill lights can be deflected up and down relative to the key light to adjust the angles of elevation and depression and the front and rear directions of the fill lights, in order to provide a lighting angle different from that of the key light; and the support assembly is pivoted with a sensor, and the sensor can be rotated axially relative to the support assembly to adjust a sensing direction.

Compared with the prior art, the present invention has the following advantages:

1. The two fill lights can be deflected up and down relative to the key light, thereby adjusting the angles of elevation and depression and the front and rear directions of the projected light, providing a lighting angle different from the key light or even in the opposite direction, and expanding the lighting range.

2. The sensor can rotate 360 degrees relative to the axis of the support assembly to adjust the sensing angle, so that the outdoor projection light can adjust the sensing direction as needed after installation, improve the convenience of installation and use, and improve the deficiencies of the conventional LED sensor lights that cannot adjust the sensing range conveniently and needs repeated installation and removal for confirmation.

The technical characteristics of the present invention will become apparent with the detailed description of preferred embodiments accompanied with the illustration of related drawings.

DESCRIPTION OF THE PREFERRED EMBODIMENTS

Figure 1:
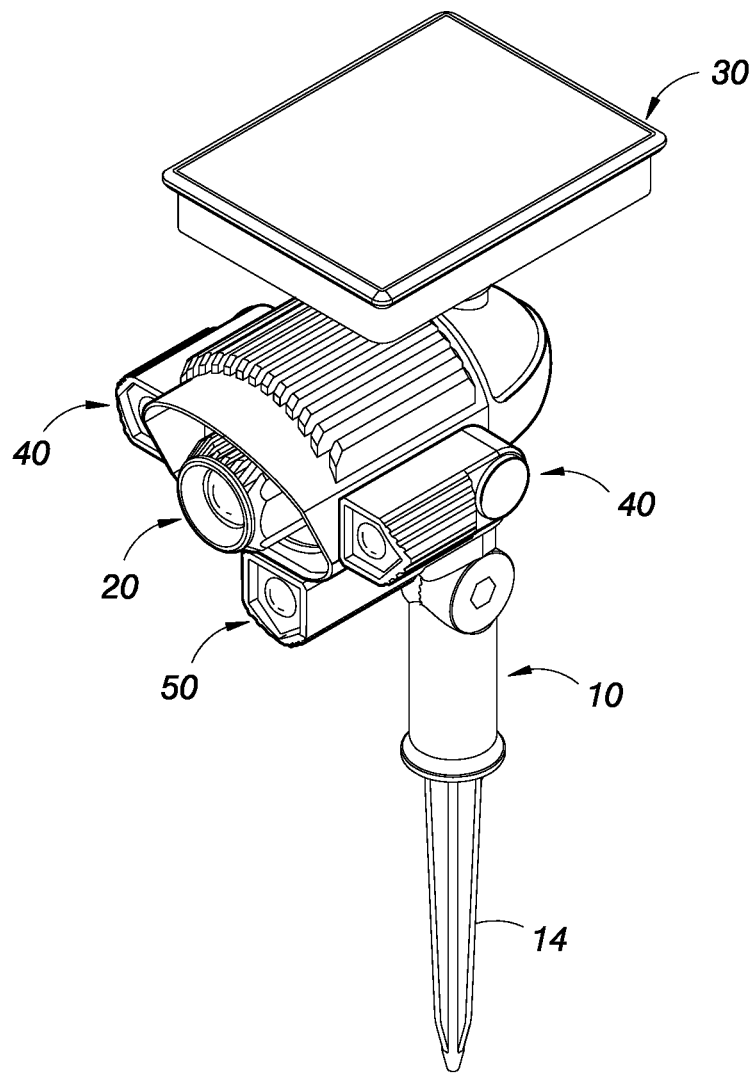
FIG. 1 is a perspective view of the present invention.
Figure 2:
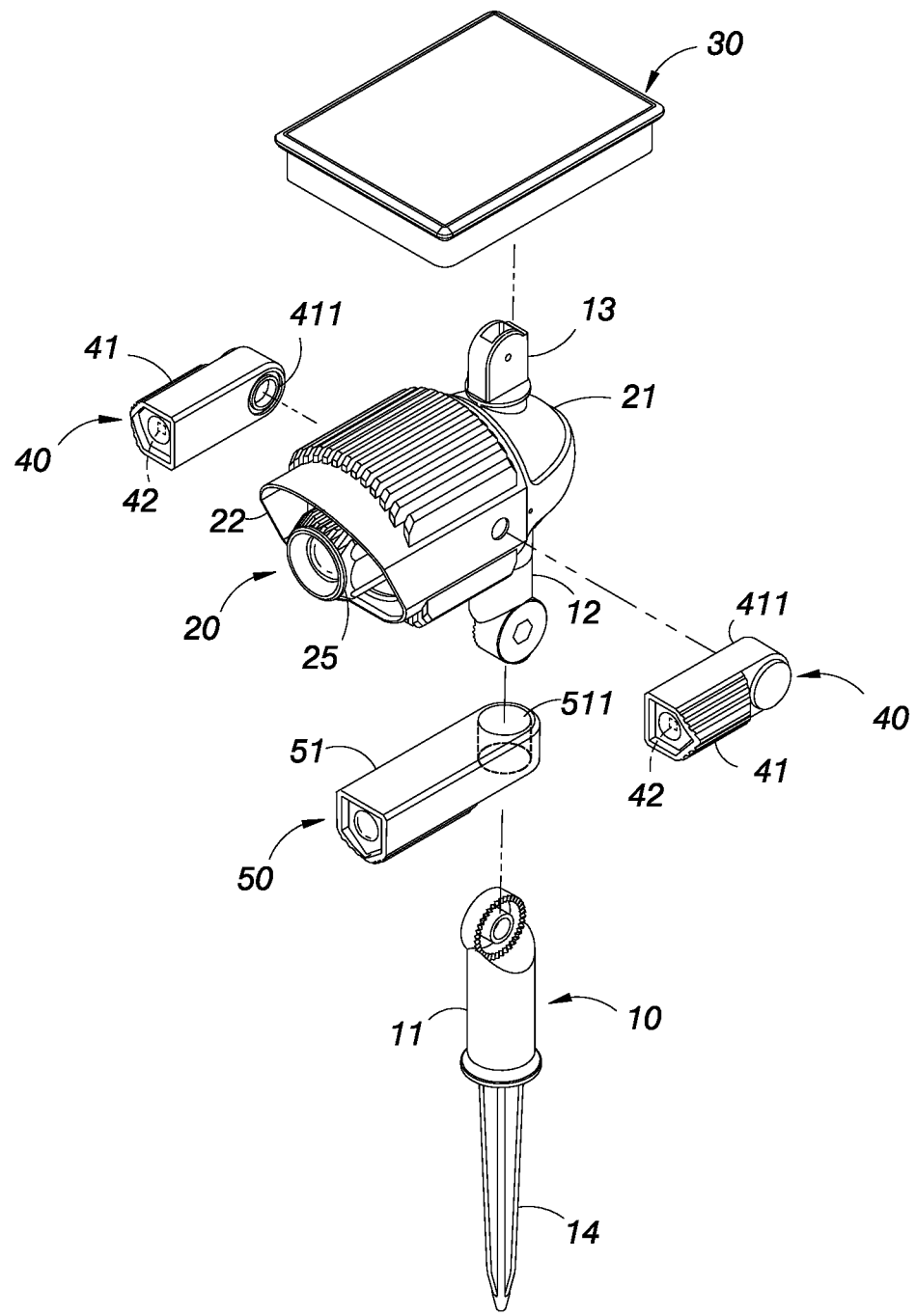
FIG. 2 is an exploded view of the present invention.
Figure 3:
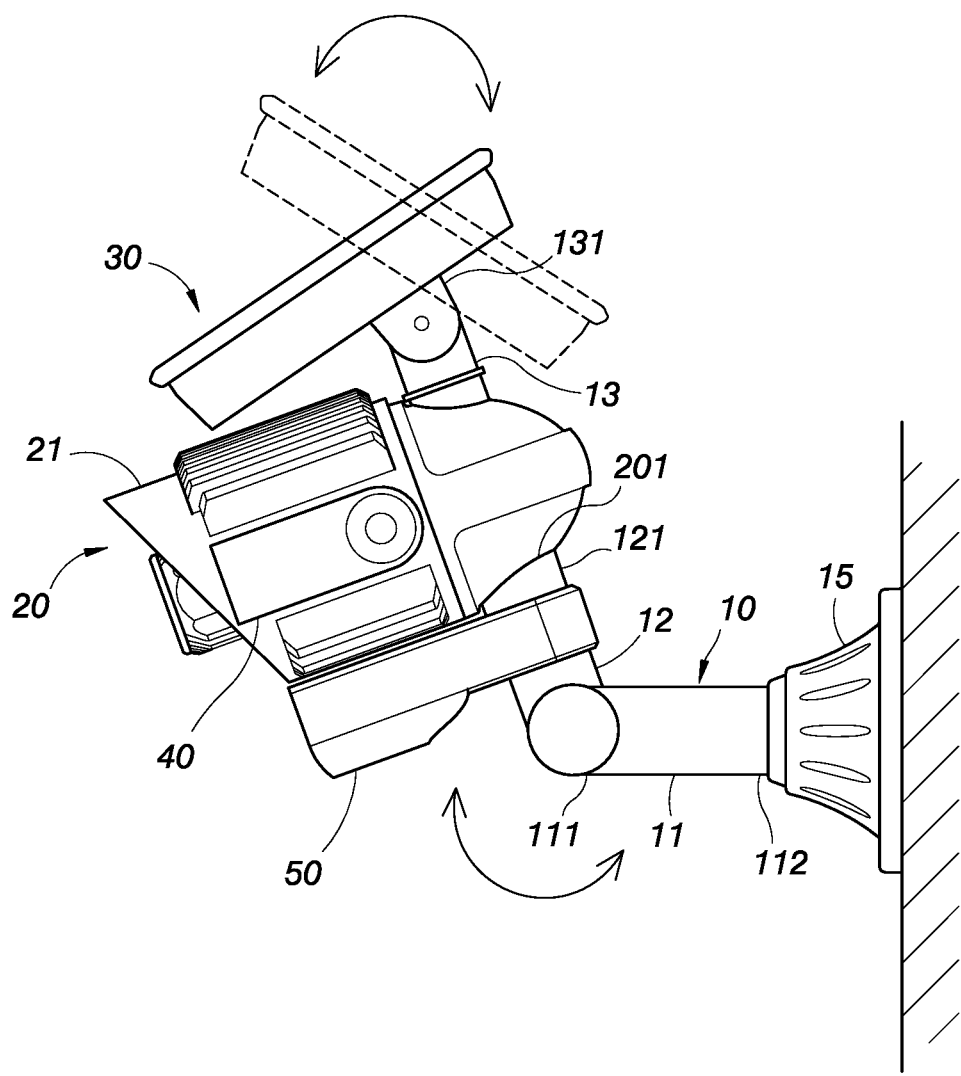
FIG. 3 is a schematic view of adjusting the angle of a key light and a support assembly of the present invention.

With reference to FIGS. 1 to 3 for a multi-directional adjustable solar outdoor projection light of the present invention, the multi-directional adjustable solar outdoor projection light includes a support assembly 10 capable of adjusting a support angle, a key light 20 installed to the top of the support assembly 10 and capable of projecting a light towards the front, and a solar power module 30 disposed at the top of the key light 20.

The support assembly 10 includes a lower support rod 11, an upper support rod 12, and a pivot rod 13. The lower support rod 11 is provided for fixing the whole set of the solar outdoor projection light and has a top 111 provided for pivoting with the upper support rod 12, and the upper support rod 12 has a top 121 provided for fixing a bottom 201 of the key light 20, such that the key light 20 and the upper support rod 12 can be deflected upwardly and downwardly relative to the lower support rod 11 to adjust the angles of elevation and depression, so as to adjust the lighting angle of the key light 20.

The pivot rod 13 has a top 131 provided for installing the solar power module 30, such that the solar power module 30 can adjust a defection angle relative to the pivot rod 13, so as to optimize the light collection effect.

In an embodiment, the bottom 112 of the lower support rod 11 has an insert part 14 as shown in FIG. 1 that can be detachably inserted into ground soil, or the bottom 112 of the lower support rod 11 as shown in FIG. 3 has a positioning part 15 that can be detachably fixed onto a wall or any plane.

The present invention is characterized in that both sides of the key light 20 are pivoted with a fill light 40, and the two fill lights 40 can be deflected up and down relative to the key light 20 to adjust the angles of elevation and depression of the projected light and the front and rear directions of the fill lights in order to provide the key light 20 a different or even opposite lighting angle and expand the lighting range.

In addition, the support assembly 10 is pivoted with a sensor 50, and the sensor 50 can be rotated axially relative to the support assembly 10 to adjust a sensing direction, such that the sensing range of the outdoor projection light can be adjusted as needed after installation, and the convenience of installation and use can be improved.

Figure 4:
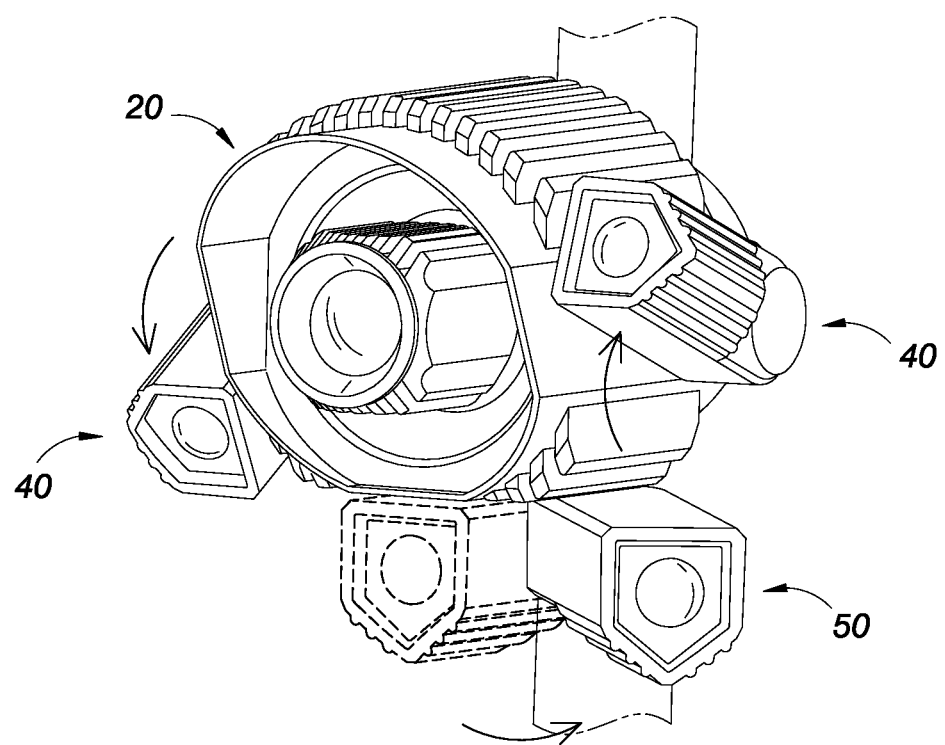
FIG. 4 is a first schematic view of an application of the present invention.
Figure 5:
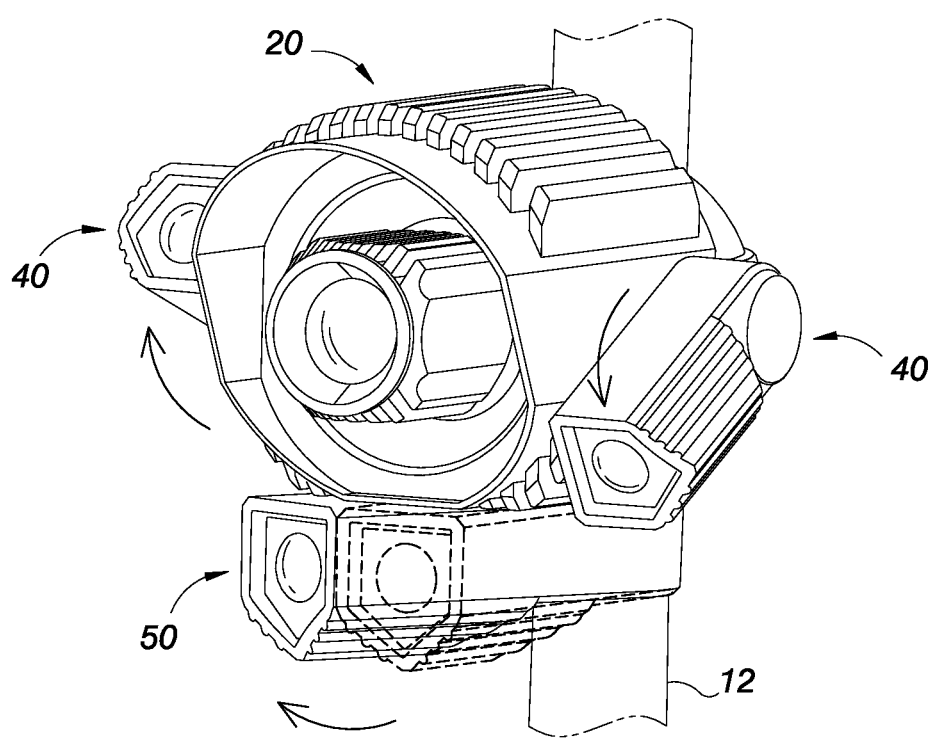
FIG. 5 is a second schematic view of an application of the present invention.
Figure 6:
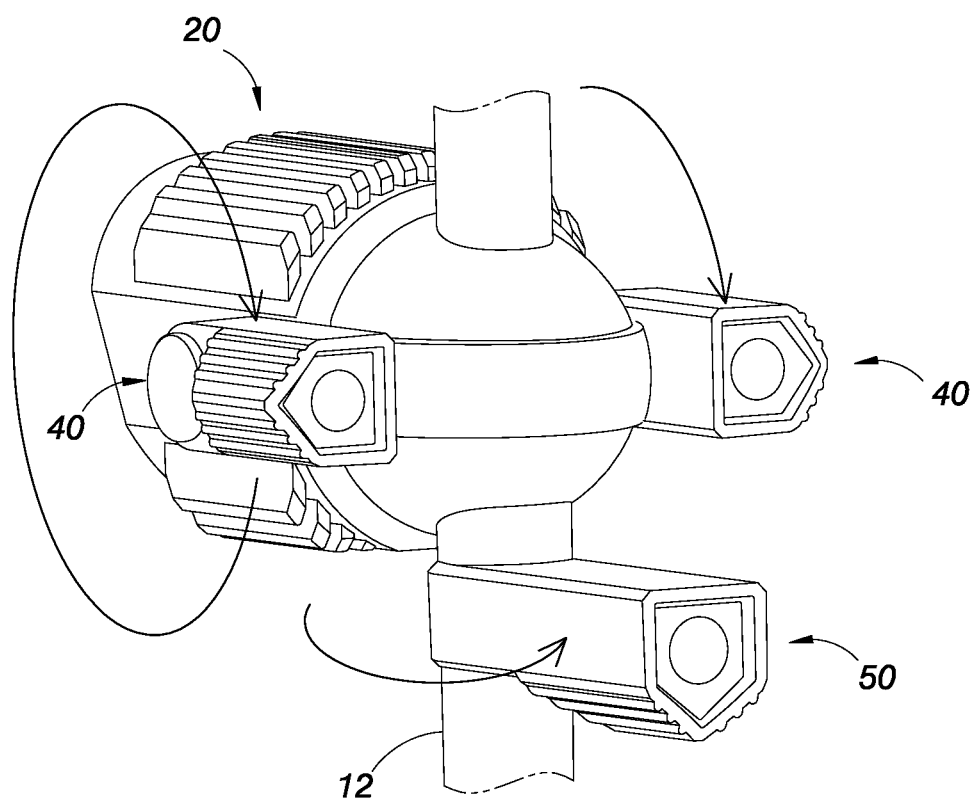
FIG. 6 is a third schematic view of an application of the present invention.
Figure 7:
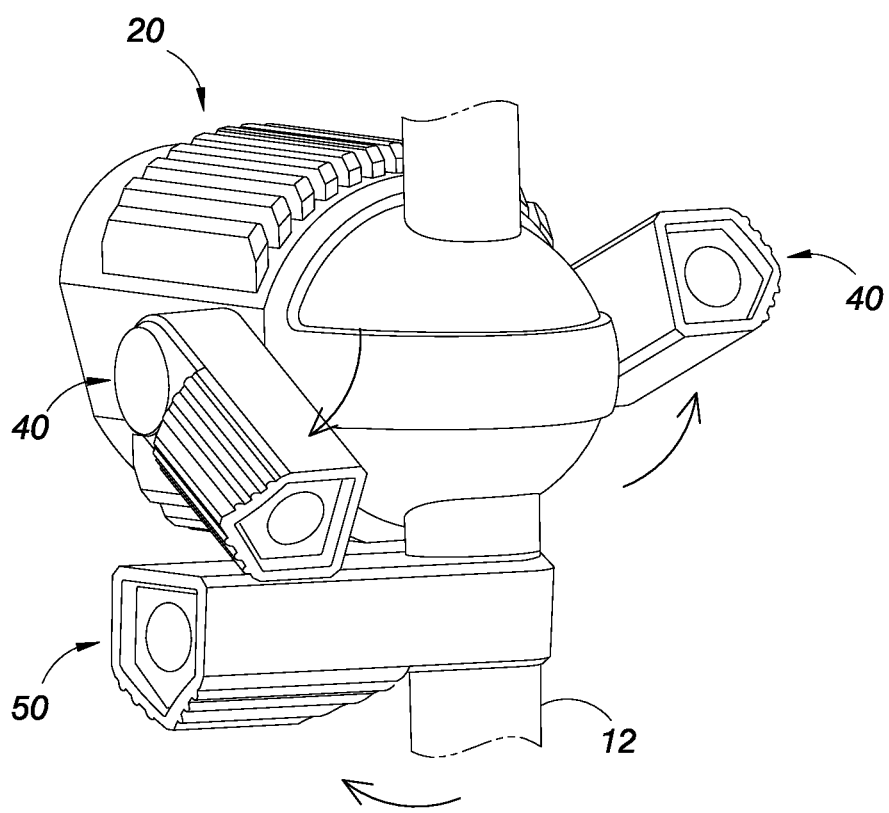
FIG. 7 is a fourth schematic view of an application of the present invention.

With reference to FIGS. 4 to 7 for the applications of the present invention, the two fill lights 40 and the sensor 50 can be deflected to provide the users a wider lighting range and a more convenient use. For example, the key light 20 and the two fill lights 40 can illuminate the front at the same time as shown in FIG. 1, or the lighting angle of the two fill lights 40 can be adjusted by the user, such that the key light 20 and the two fill lights 40 have the lighting angles with different angles of elevation and depression as shown in FIGS. 4 and 5, or the two fill lights 40 can be deflected to rear with a lighting direction opposite to that of the key light 20 as shown in FIGS. 6 and 7 to achieve the effect of adjusting different lighting angles and expanding the lighting range.

In addition, if the user wants to change the selected sensing area after the installation of the projection light, the user can adjust the sensing direction of the sensor 50 conveniently. For example, the sensor 50 can be deflected towards the front to adjust the sensing direction as shown in FIGS. 4 and 5, or the sensor 50 can be deflected towards the rear to adjust the sensing direction as shown in FIGS. 6 and 7, in order to overcome the deficiencies of the conventional LED sensor lights that cannot adjust the sensing range conveniently and needs repeated installation and removal for confirmation.

With the structure above, the present invention can adjust the lighting range, angle and sensing direction to provide users a broader lighting range and expand the function and the scope of applicability of the product.

Figure 8:
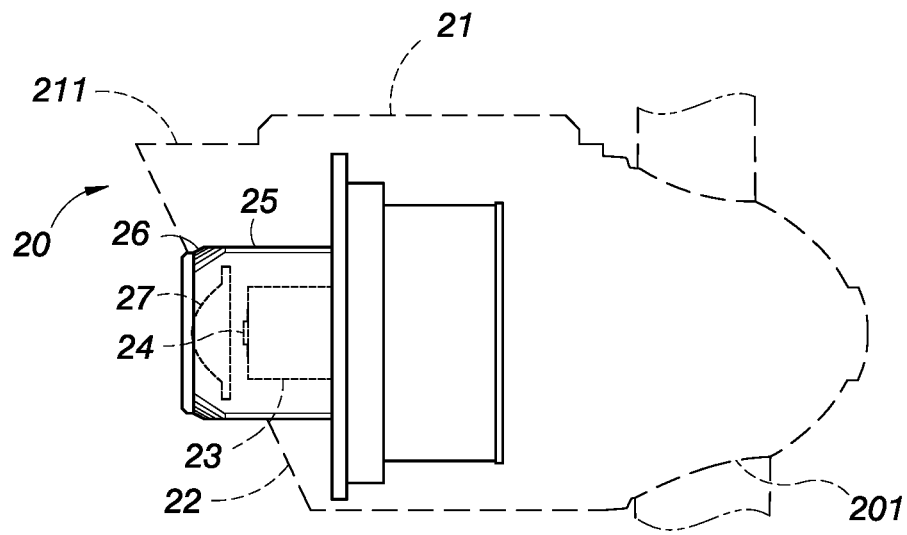
FIG. 8 is a schematic view showing the structure of a key light of the present invention.
Figure 9:
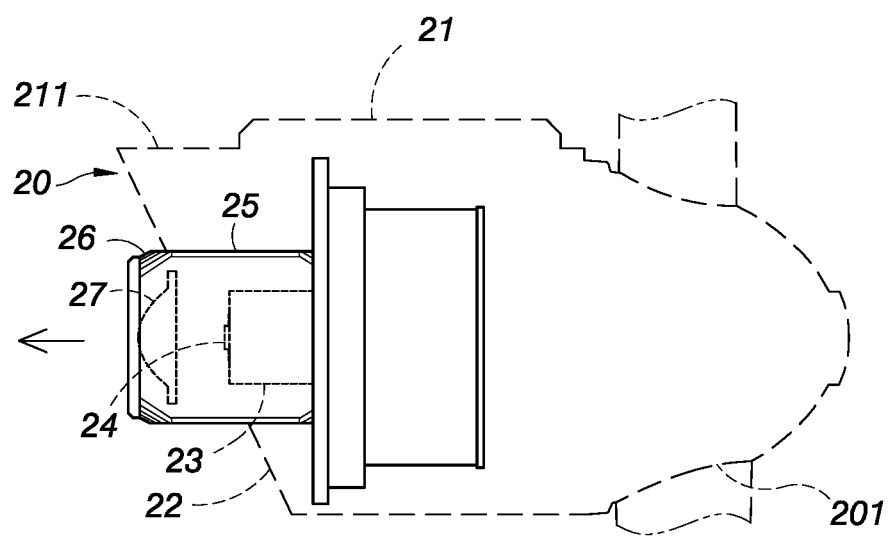
FIG. 9 is a schematic view of adjusting the focal length of light of a key light of the present invention.

In FIGS. 1, 8 and 9, the key light 20 includes a lamp housing 21, an opening 22 formed at a front end 211 of the lamp housing 21, a fixed lamp holder 23 installed in the lamp housing 21, an LED 24 installed to the fixed lamp holder 23, configured to be facing the opening 22 and electrically coupled to the solar power module 30 and the sensor 50.

The LED 24 has an adjusting socket 25 disposed at the front of the LED 24 and configured to be corresponsive to the inner periphery of the opening 22 of the lamp housing 21 and a curved lens 27 installed to the inner periphery of the adjusting socket 25, and an adjusting portion 26 disposed on an outer surface of the adjusting socket 25 and provided for the user to operate the adjusting socket 25 in order to adjust the front or rear positions and drive the curved lens 27 to move back and forth relative to the LED 24, such that the light emitted by the LED 24 can pass through the curved lens 27 to change its focal length of light, wherein the curved lens 27 of an embodiment is a convex lens.

In an embodiment as shown in FIG. 2, each fill light 40 includes an outer shell 41, and a second LED 42 electrically coupled to the solar power module 30 and the sensor 50, and the second LED 42 is fixed into the outer shell 41, and the outer shell 41 has a rear end 411 with a side pivotally coupled to a side of the lamp housing 21 of the key light 20, so that the second LED 42 can be deflected upwardly and downwardly relative to the key light 20.

In an embodiment, the sensor 50 further includes a casing 51 having a rear end 511 pivoted to the upper support rod 12 and configured to be corresponsive to the top or the bottom of the key light 20, such that the sensor 50 can be rotated axially relative to the upper support rod 12.

While the invention has been described by means of specific embodiments, numerous modifications and variations could be made thereto by those skilled in the art without departing from the scope and spirit of the invention as set forth in the claims.

What is claimed is:

1. A multi-directional adjustable solar outdoor projection light, comprising a support assembly capable of adjusting a support angle, a key light installed on a top of the support assembly and capable of projecting a light towards a front of the key light, and a solar power module disposed on a top of the key light, wherein the key light comprises two sides which each respectively comprises a pivotable fill light, the two fill lights deflectable up and down and pivotable through at least 180° relative to the key light to adjust angles of elevation and front and rear projection directions of the fill lights, in order to provide lighting angles different from that of the key light; and a sensor rotatably connected to the support assembly, the sensor rotatable through at least 180° axially relative to the support assembly to adjust a sensing direction for the front and rear projection directions.

2. The multi-directional adjustable solar outdoor projection light according to claim 1, wherein the key light comprises a lamp housing having an opened formed at a front end thereof, a fixed lamp holder installed in the lamp housing, an LED installed on the fixed lamp holder, configured to face the opening, and electrically coupled to the solar power module and the sensor, and the LED has an adjusting socket disposed at a front thereof, and a curved lens is installed to an inner periphery of the adjusting socket, the adjusting socket configured to drive the curved lens to move relative to the LED, such that focusing of light emitted by the LED is changed after passing through the curved lens.

3. The multi-directional adjustable solar outdoor projection light according to claim 2, wherein the adjusting socket has an adjusting portion disposed on an outer surface thereof.

4. The multi-directional adjustable solar outdoor projection light according to claim 2, wherein each fill light comprises an outer shell, and a second LED electrically coupled to the solar power module and the sensor, and each second LED is fixed into the outer shell of the respective fill light, and a side of a rear end of each outer shell is pivotally coupled to a respective side of the lamp housing of the key light to deflect the second LED upwardly and downwardly relative to the key light.

5. The multi-directional adjustable solar outdoor projection light according to claim 1, wherein the support assembly comprises a lower support rod, an upper support rod, and a pivot rod; the lower support rod has a top pivotally connected to the upper support rod, and the upper support rod has a top configured to fix to a bottom of the key light, such that the key light and the upper support rod can be deflected upwardly and downwardly relative to the lower support rod, and the pivot rod has a top configured to connect to the solar power module, such that the a deflection angle of the solar power module relative to the pivot rod can be adjusted.

6. The multi-directional adjustable solar outdoor projection light according to claim 5, wherein the sensor further comprises a casing, the casing having a rear end rotatably coupled to the upper support rod such that the sensor is rotatable axially relative to the upper support rod.

7. The multi-directional adjustable solar outdoor projection light according to claim 5, wherein the lower support rod has a positioning part disposed at a bottom thereof and detachably fixable onto a wall or planar surface, or an insert part configured for insertion into ground.

* * * * *